United States Patent [19]

Dybel

[11] 4,010,679
[45] Mar. 8, 1977

[54] PIEZOELECTRIC TRANSDUCER SENSOR FOR USE IN A PRESS

[75] Inventor: Frank R. Dybel, Calumet City, Ill.

[73] Assignee: International Measurement & Control Co., Park Forest South, Ill.

[22] Filed: May 12, 1969

[21] Appl. No.: 832,542

Related U.S. Application Data

[63] Continuation of Ser. No. 670,189, Sept. 25, 1967, abandoned.

[52] U.S. Cl. .................. 100/53; 72/26;
73/88.5 R; 100/99; 192/129 A; 192/150;
310/8.1
[51] Int. Cl.² .......................... B30B 15/28
[58] Field of Search ............. 100/48, 50, 53, 99,
100/214; 73/88, 88.5; 72/26, 32, 33; 173/12;
83/522; 192/129 A, 150; 317/123, 148.5;
310/8.1, 8.7

[56] References Cited
UNITED STATES PATENTS

| 2,864,125 | 12/1958 | Kelley | 100/99 X |
|---|---|---|---|
| 2,890,778 | 6/1959 | Braun et al. | 100/53 UX |
| 2,937,734 | 5/1960 | Sommer | 192/150 |
| 3,130,329 | 4/1964 | Cother | 310/8.1 |
| 3,426,873 | 2/1969 | Tezuka | 192/150 |
| 3,444,390 | 5/1969 | Breidenbach et al. | 310/8.1 X |

Primary Examiner—Billy J. Wilhite
Attorney, Agent, or Firm—Leydig, Voit, Osann, Mayer & Holt, Ltd.

[57] ABSTRACT

A piezoelectric transducer is positioned on a member of a power press subject to stress under dynamic conditions. A ball joint bracket means fixes and maintains the transducer on the member parallel with the direction of force and with the faces of the piezoelectric ceramic plate perpendicular thereto. The high voltage signal generated by the transducer is transmitted to a signal conditioning circuit and impressed upon the grid of a grid-controlled vacuum tube. If the conditioned signal is sufficient to overcome the biasing grid voltage, it activates an electric circuit for the performance of one or more functions, including stopping the power press in the case of an overload, counting the number of times the press is overloaded or the number of times a workpiece is produced, and measuring the press load during a work cycle.

17 Claims, 4 Drawing Figures

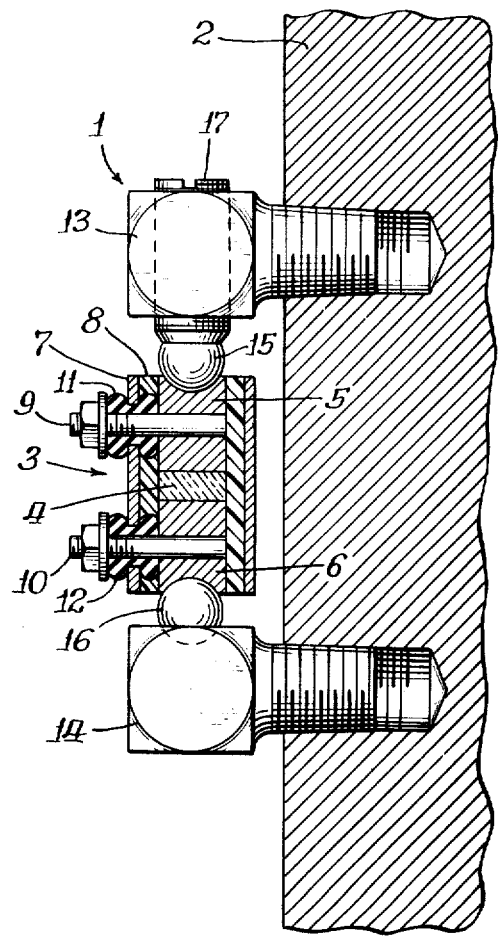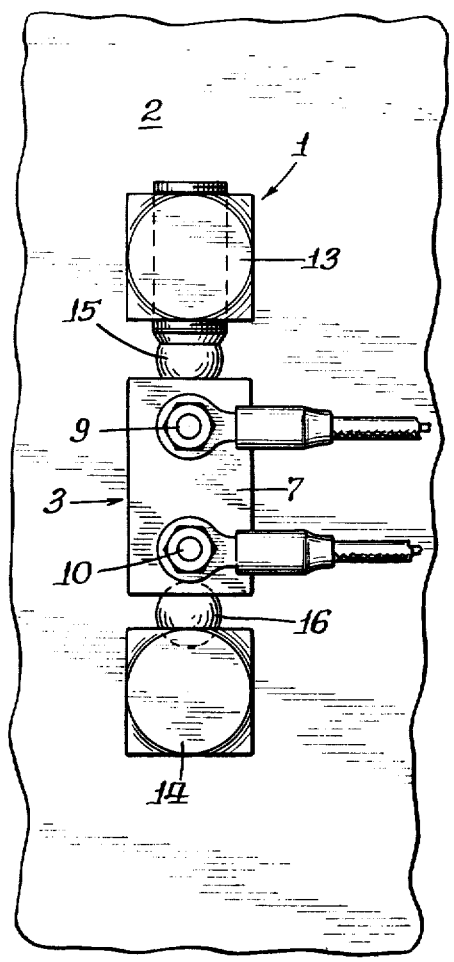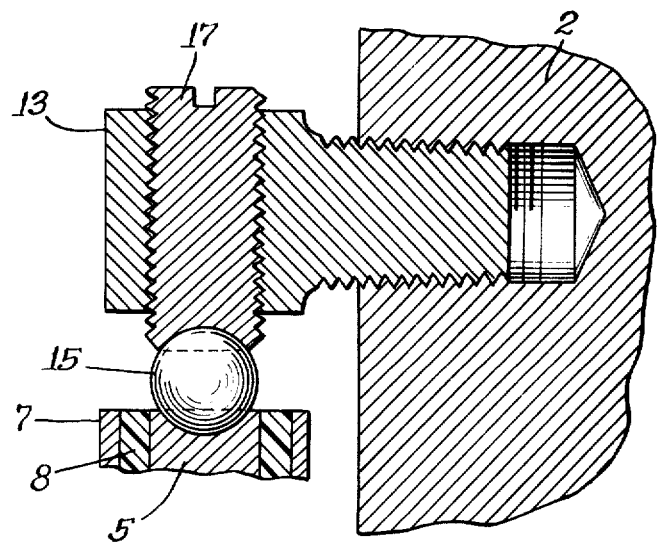

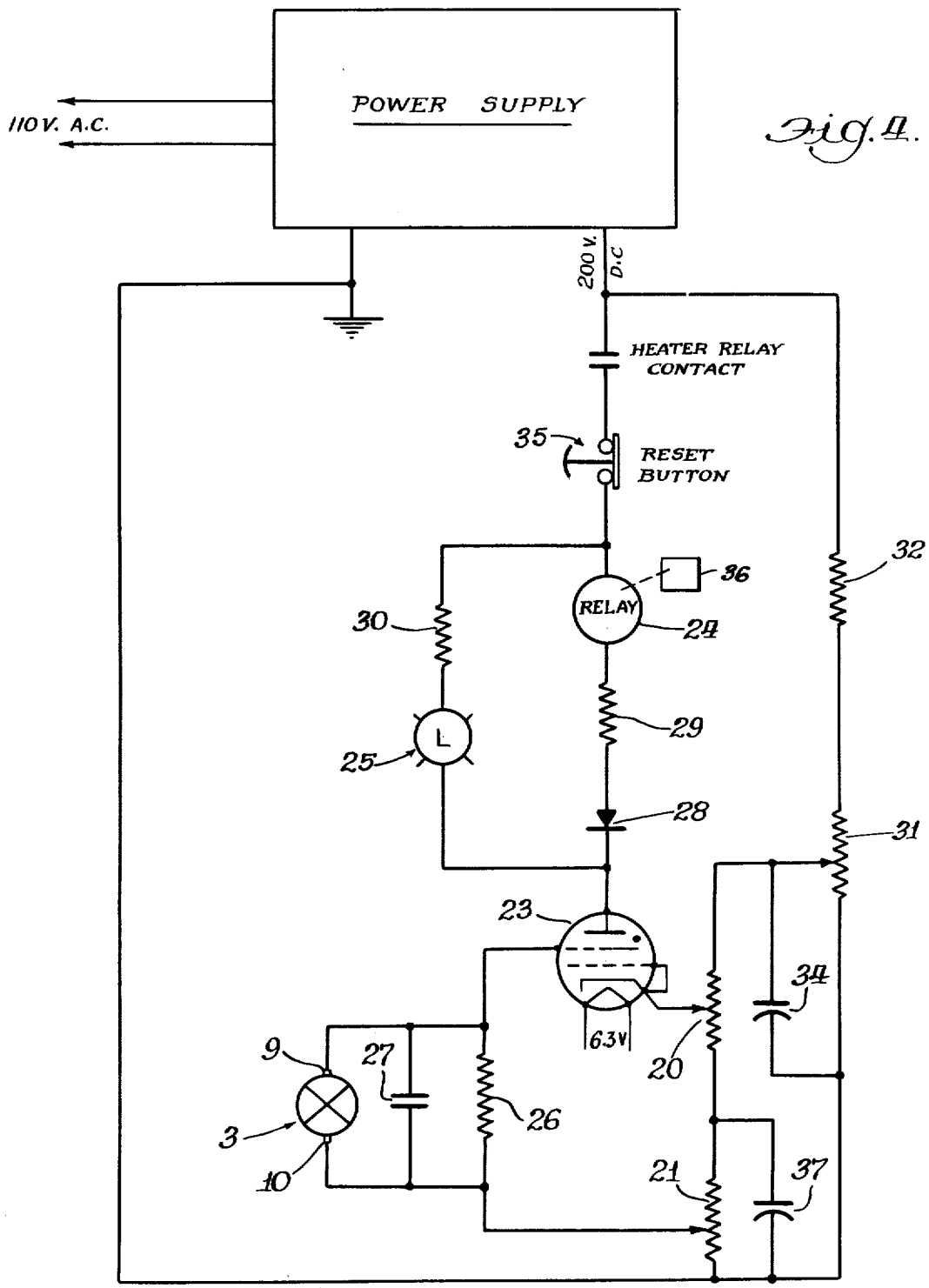

PIEZOELECTRIC TRANSDUCER SENSOR FOR USE IN A PRESS

BACKGROUND

This application is a continuation of prior copending application Ser. No. 670,189, filed on Sept. 25, 1967 now abandoned and relates to piezoelectric load sensing and controller means responsive to a parallel shunted portion of the stress in a power press under dynamic conditions of a work cycle of the press.

The signal generating capabilities of piezoelectric crystals when subjected to stress have long been utilized to advantage in a variety of applications. In accelerometers, for example, the piezoelectric crystal is employed as a frequency determining element to alter or control the oscillation frequency of an electronic oscillator. In this instance the stress imposed upon the crystal is the result of a direct application of the force of acceleration of a moving mass upon the crystal. In other proposed uses where the voltage output of the stressed piezoelectric element is employed, the element is also subjected to the direct application of the stressing force. The use in these instances is of course limited by the strength of the crystal to withstand the force applied to it.

While the prior art is abundant with proposals for strain gauges of the resistance-type and the displacement-type for use as a load sensing and controller means on power presses, the practical, commercial use of a piezoelectric transducer for these purposes was unknown prior to this invention. In the resistance and displacement types of gauges a very small strain input produces an extremely small output signal, e.g., milliamperes or volts. In the case of this invention, however, the same small strain input results in a very high voltage output signal. The peak voltage output may be as high as thousands of volts and always of orders of magnitude greater than millivolts. There is no need for amplification of this output signal for subsequent use to activate load measuring or machine controlling means. In contrast to the signal generated by the aforementioned resistance and displacement type strain gauges, the high voltage output signal conditioned to transform it to a lower voltage value is used directly to energize or trigger one or more electronic circuits to activate load measuring means, press stopping means and counting means.

SUMMARY

In accordance with this invention a piezoelectric transducer is employed on a force carrying member of a power press as a strain sensing device. The piezoelectric transducer comprises two terminal blocks electrically insulated from each other between which is positioned a piezoelectric element. The piezoelectric element may be any of the known materials which produces a voltage upon application of force, for example, quartz crystals and ceramic crystals. The two terminal blocks and piezoelectric element are suitably encased in a magnetic and electrical shield. The transducer unit is mounted between two brackets fixed to the force carrying member of the press, such as pitman or link. The brackets are aligned parallel to the direction of stress to be sensed in the force carrying member and clampingly engage the unit therebetween so that the clamping force of the brackets is substantially parallel to and aligned with a line normal to the interfaces between the crystal and the terminal blocks.

The piezoelectric transducer produces a high voltage output signal during the work cycle of the machine in accordance with the loading force on the force carrying member. This signal is transmitted to a suitably responsive electronic circuit. The circuit, depending upon the peak voltage of the signal, is activated thereby to cause current to flow in the circuit and actuate monitoring means for the control of the press or measurement of the operation of the press. In general, the circuit may comprise any means which is actuated by impressing thereon the voltage output, or a portion thereof, of the piezoelectric transducer during the work cycle of the press. For example, the voltage actuated means may be a grid-controlled vacuum tube with a bias voltage thereon predetermined with respect to the voltage of the conditioned output signal of the transducer for a given condition of the operation of the press. The conditioned output signal overcomes the bias voltage and triggers the activation of the circuit and the monitoring means which indicates the occurrence of that condition of operation of the press. Alternatively, the voltage actuated means may be a solid state, high impedance circuit.

It will be appreciated that this invention does not require amplification of the output signal of the piezoelectric transducer. The output signal, which may be on the order of several thousand volts at peak, is transformed into a lower voltage value and then directly employed without the need of intermediate stages of amplification prior to the utilization of the signal in an indicating or measuring system. There is no time delay due to an amplification stage between the generation of the signal and utilization of the same. The design problems associated with amplification of small output signals, e.g., microamperes and millivolts in other load sensing systems, are avoided. The present invention is less sensitive to electrical "noise" than other load sensing systems. For all practical purposes, it is independent of forces of accleration during movement of the force carrying member of the press.

DRAWINGS AND PREFERRED EMBODIMENT

In the drawings:

FIG. 1 illustrates partly in cross-section, a side view of a piezoelectric transducer mounted on a force carrying member of a power press;

FIG. 2 is a front view of the transducer of FIG. 1;

FIG. 3 is a view in cross-section of the top bracket of FIG. 1 showing the adjustable clamping means therein and the engagement with the terminal block; and FIG. 4 is a diagram of the voltage responsive electronic circuit.

In FIGS. 1–3, the numeral 1 designates the piezoelectric transducer unit mounted on a force carrying member 2 of a press. The force carrying member 2 is illustrated schematically. The piezoelectric transducer 3 is shown in cross-section as consisting of a piezoelectric ceramic crystal 4 positioned between a top terminal block 5 and a bottom terminal block 6 with the top and bottom faces of the crystal in contact with and against the surface of each of the respective terminal blocks. The terminal blocks and crystal are surrounded by a metallic sheath 7 which serves as a magnetic and electric shield. The sheath is slightly larger than the terminal blocks and crystal to provide space for a surrounding layer 8 of an encapsulating and insulating plastic layer 8. Leading from the terminal blocks through the insulating layer 8 and the metallic sheath 7 are terminals 9 and 10 with suitable connections for attachment of leads to the electronic circuit. The leads attached to the terminals are shown in FIG. 2, and may be suitably shielded cables. The terminals and hence the terminal blocks are electrically insulated from the sheath 7 at the passageway therethrough by the terminal insulators 11 and 12. The sheath 7 is grounded to the shield of the shielded cables by suitable connections, not shown.

The piezoelectric transducer 3 is mounted on the force carrying member 2 so that a line normal to the crystal faces at the interfaces between the crystal and the terminal blocks is parallel to and aligned with the stress to be measured in the member 2 when under load during a working cycle. The transducer 3 is supported between two points on the member 2 and is spaced therefrom. The supported transducer provides what may be characterized as a parallel mechanical circuit for shunting a small portion of the stress in the member 2 to the transducer 3. When so subjected to the stress, the transducer produces its output signal.

In the illustrated embodiment, the piezoelectric transducer is clamped between the ends of two brackets 13 and 14. The brackets shown are screw-in type brackets, but the brackets may be fixed to the member 2 by other means, e.g., by welding. The ends of the brackets between which the transducer is clamped are provided with ball and socket joints. The balls 15 and 16 engage the terminal blocks 5 and 6, respectively. The brackets are electrically insulated from the terminal blocks and this is accomplished in this embodiment by balls 15 and 16 of a refractory insulating material. One of the terminals may, if desired, be grounded through its bracket and the machine to which it is attached. Thus, the ball 16 may be of metal and provide a ground through the member 2 and bracket 14 for the terminal block 16 and terminal 10, as will be understood by reference to the circuit diagram of FIG. 4.

Means are provided for adjusting the distance between the balls of the brackets for ease in positioning and aligning the transducer therebetween. This is provided by a set screw 17 in the end of the top bracket 13, as shown most clearly in FIG. 3. As also shown there, a socket is formed in the top terminal block 5 for the ball 15. After the transducer 3 is in position, the set screw is screwed to clamp it in place under a slight clamping pressure. This places the crystal in a prestressed condition. The amount to which the crystal is prestressed must be sufficient so that it is in a stressed condition under all possible conditions of loading during the work cycle of the press.

The transducer 3 with its lead terminals 9 and 10 is shown in the electronic circuit diagram of FIG. 4. Generally, the electronic circuit represents a series circuit of a voltage actuated controller means and a relay means with the output of the transducer terminals connected to the voltage actuated controller means and a D.C. supply of power providing a D.C. voltage impressed on the voltage actuated controller means. A visual indicator means may be connected in parallel with the relay means for purposes subsequently explained. The circuit is activated when the output signal from the piezoelectric transducer is large enough to overcome the impressed voltage on the voltage actuated controller means. When so overcome, the circuit is activated and current flows in the circuit to activate the relay means for operation of the press monitoring means.

The circuit of FIG. 4 will be explained with reference to its monitoring function in the event of an overload on the press, in which case it is desired to stop the operation of the press. For purposes of an aid in explanation it will be assumed that the transducer 3 is mounted as described above on one of the links of a four point power press. The press is subjected to a given known load and the stress in each link is known. The numeral 20 designates a 10K ohm variable resistance. The variable positionable lead thereof is connected to the cathode of the vacuum tube 23. The position of this lead or slider is controlled by a dial with position readings of from 0 to 200, for example, to indicate percentage of load. The dial is not shown. If it is desired that the press should not exceed the known load in the link, the dial is set at 100. The variable resistance 21, also of 10K ohms, is adjusted to trigger the vacuum tube 23 whereupon current flows in the plate circuit activating the relay 24 and causing the gaseous discharge lamp 25 to light up. The path of current flow from the plate of the tube 23 is through the one leg of the circuit of the diode 28, resistor 29 (10K ohms) and the relay and the parallel leg containing the lamp 25 and the 40K ohms resistor 30. The variable resistance is then backed away slightly from this setting until the lamp 25 is extinguished and the relay deactivated. At this time the grid of the tube 23 has impressed thereon a biasing voltage equal or approximately equal to the voltage of the output signal of the transducer conditioned by the grid R-C circuit of 10 megaohms and 0.002 microfarads designated by the resistor 26 and condenser 27. The grid R-C circuit conditions the output signal of peak high voltage and short duration to a low voltage and longer duration. The cathode and grid biasing voltages are tapped off of the variable resistances 20 and 21 with appropriate voltage adjustment provide by the 25K ohm variable resistance 31 and 10K ohm resistance 32. The 100 microfarad condensers 37 and 34 in combination with the resistors 20, 21 and 31 provide R-C circuits for maintaining steady cathode and grid voltages.

The known load may now be removed from the press. When the press is in operation at a load no greater than the known load at which the machine has been rated, the output signal of the transducer 3 as conditioned in the R-C circuit 26 and 27 will be insufficient to overcome the bias voltage on the grid of the tube 23. Accordingly, the energized circuit remains inactive and current does not flow in the tube circuit. If the machine is loaded above its rated load, the stress in the link is sensed during the operation of the machine by the transducer 3. The conditioned output voltage signal is impressed upon the grid and drives it to trigger the tube 23. The relay is thereupon activated by the resultant current flow to activate a machine monitoring means shown schematically at 36 to perform its monitoring function which, in reference to a condition of overload, is to stop the operation of a press and, if desired, to count and totalize the number of times a press is overloaded during a given period of press operation. The monitoring means for instance may comprise a control switch for the press and a counter mechanism, the details of which do not constitute this invention. The power press can only be made ready for the next work cycle by deactivating the circuit, which may be accomplished by pushing the reset button of a resettable circuit breaker 35 shown located in series with the relay 24. The relay is returned to its original position and the monitoring means accordingly returned to its prior state, for example, returning the press control switch to its "on" position.

The lamp 25 is desirable to provide visual indication that the press has been stopped as a result of the output of the transducer 3. The lamp is also desirable in a four point press installation when a piezoelectric transducer is employed on each of the four links of the press. Each transducer will have a voltage responsive electronic circuit associated with it. The lamp provides a quick indication of which one or more of the links is overloaded that caused the press to stop.

For simplicity of disclosure the invention has been illustrated with only one piezoelectric transducer on a force carrying member of a press, but it should be understood that two transducers positioned diametrically opposite to each other may be desirable. In such an installation the transducers are electrically connected either in series or parallel with respect to each and in parallel across the R-C circuit in the grid circuit of the tube 23. Any lateral or bending movement forces are thus cancelled, as is known in resistance or displacement strain gauge installations.

Should some work operation of the press require a load different from the known load at which the press had been rated, as above described, it is only necessary to change the dial setting of the variable resistance 20 controlling the cathode voltage of the tube 23. The dial is set to a value above 100 percent if the load on the machine is to exceed its rated load. If less load is demanded, the dial is then set at a value below the 100 percent setting corresponding to the lesser load requirement. Since the initial rated load was known, it is also possible to measure the exact load on the press for a given work piece. Thus, if a new work piece requires a higher loading and it is desired to know the required load, the press can be cycled through its operation and the dial setting of the variable resistance 20 moved incrementally to higher values until the press cycles without stopping. If this occurs when the dial setting is, for example, 120, then the required higher load of the press is 120 percent of the rated, known load.

The output of the piezoelectric transducer can also be utilized to count the number of pieces actually produced by the machine. For this purpose the transducer is mounted on a force carrying member of the press as described above. Its output signal is transmitted to the grid controlled vacuum tube across a signal conditioning R-C circuit, as above described. The tube is biased to trigger at a minimum output signal representative of a load condition of the machine having done work, but less than that of a condition of overload. When the voltage of such conditioned signal is impressed on the grid, the tube is triggered to cause current to flow and activate a relay. The relay in turn actuates a counter which totalizes the number of times it is actuated.

I claim:

1. In a machine having two work members movable with respect to each other and subject to repetitive loading forces for transmission to a work piece between said members, at least one force carrying member carrying and transmitting said loading force to one of said work members, and an electrically responsive strain sensing device positioned on said force carrying member, the improvement in combination therewith wherein said sensing device is a piezoelectric transducer, said piezoelectric transducer comprising a piezoelectric element, a first terminal block positioned against one face of said element, a second terminal block positioned against the opposite side of said element, and means for shielding said piezoelectric element from electric and magnetic noise, a mounting means attached to and extending from the force carrying member, said mounting means comprising a first and a second bracket spaced from each other, one end of each bracket being attached to said force carrying member, the other ends of said brackets having contact means for engagement with said terminal blocks, at least one of said contact means being electrically nonconductive, said piezoelectric transducer being positioned and clamped between the said other ends of the brackets with the contact means of said first bracket engaging said first terminal block and the contact means of said second bracket engaging said second terminal block so that the clamping force of the brackets is substantially parallel to and aligned with a line normal to the interfaces between said element and terminal blocks, and an energized electronic circuit electrically connected to the terminal blocks which circuit is predeterminedly activated by the output signal of the piezoelectric transducers when stressed during a work cycle of the machine to activate a machine monitoring means.

2. In a machine in accordance with claim 1 wherein said shielding means comprises a metal sheath surrounding said piezoelectric element.

3. In a machine in accordance with claim 1 wherein said element is a ceramic crystal and the said other end of said first bracket contains an adjustably movable means which can be adjustably moved to fixed positions away from and toward the terminal blocks to position the piezoelectric transducer in the mounting means and adjustably set the clamping force upon the mounted piezoelectric transducer.

4. In a machine in accordance with claim 3 wherein the ends of said brackets constitute ball and socket joints wherein the balls thereof are electrically nonconductive and engage said respective terminal blocks.

5. In a machine in accordance with claim 4 wherein the socket of one of said brackets is adjustably movable with respect to the bracket for adjustable movement to fixed positions away from and toward the terminal blocks to position the piezoelectric transducer in the mounting means and adjustably set the clamping force upon the mounted piezoelectric transducer.

6. In a machine in accordance with claim 5 wherein said socket is in the end of a set screw screwed into the end of the bracket.

7. In a machine in accordance with claim 1 wherein said electronic circuit comprises a voltage actuated controller means, a relay means connected in series with the voltage actuated means and actuated by current flowing therethrough, a source of D.C. power for said circuit, a D.C. voltage source providing a voltage impressed on said voltage actuated controller means to prevent current through said circuit at the compressed voltage, and electrical leads connecting and voltage actuated means with the terminal blocks of said piezoelectric transducer to transmit to said means said voltage output signal.

8. In a machine in accordance with claim 7, wherein said electronic circuit includes a circuit breaker in series with said voltage actuated means and said relay means for breaking said circuit after the flow of current therethrough after actuation of said relay means.

9. In a machine in accordance with claim 1 wherein said element is a ceramic crystal and said electronic circuit comprises an electronic vacuum tube having a plate, cathode and at least one grid, a relay switch in series with the plate circuit actuated by current flowing through said circuit, a source of D.C. power for said circuit and a D.C. voltage source providing a bias voltage for said grid, said piezoelectric transducer being connected to said grid across a R-C circuit to convert the output signal of high peak, short duration voltage to a signal of low, longer duration voltage.

10. In a machine in accordance with claim 9 wherein said relay switch controls a monitoring means to stop the machine when overloaded and to count the number of times the machine is stopped and wherein said bias voltage is selected to be substantially equal to the peak output voltage of the piezoelectric transducer at a predetermined maximum loading during a work cycle, whereupon overloading of the machine the piezoelectric transducer responds to produce a conditioned output voltage signal greater than said bias signal and current flows in the circuit to actuate the relay switch, said switch thereby activating the control to stop the machine and to count the number of times the machine is overloaded.

11. In a machine in accordance with claim 9 wherein said relay switch controls a monitoring means comprising a production counter and wherein said bias voltage is a delected minimum value less than the peak output voltage of the piezoelectric transducer at a predetermined loading necessary for the machine to do work, whereupon when the machine does its intended work the piezoelectric transducer responds to produce an output voltage greater than said bias voltage and current flows in the circuit to activate the relay switch, said switch thereby activating said production counter.

12. In a machine in accordance with claim 1 wherein said means for shielding said piezoelectric element includes a metallic sheath surrounding said piezoelectric element and terminal blocks, and the said other end of said first bracket contains an adjustably movable means which can be adjustably moved to fixed positions away from and toward the terminal blocks to position the piezoelectric transducer in the mounting means and adjustably set the clamping force upon the mounted piezoelectric transducer.

13. In a machine in accordance with claim 1 wherein said first and second brackets each have one threaded end, said force carrying member having a pair of internally threaded apertures, and said threaded bracket ends each are screwed into one of said force carrying member apertures for secure engagement with said member, whereby said brackets rigidly support said transducer in close relation to said force carrying member.

14. In a machine having two work members movable with respect to each other and subject to repetitive loading forces for transmission to a work piece between said members, at least one force carrying member carrying and transmitting said loading force to one of said work members, and an electrically responsive strain sensing device positioned on said force carrying member, the improvement in combination therewith wherein said sensing device is a piezoelectric transducer,
  said piezoelectric transducer comprising a piezoelectric element, a first terminal block positioned against one face of said element and a second terminal block positioned against the opposite side of said element,
  means surrounding said piezoelectric element for shielding said element from electric and magnetic noise,
  a mounting means attached to and extending from the force carrying member, said mounting means engaging said terminal blocks to create compressive forces in said piezoelectric element and terminal blocks substantially parallel to and aligned with a line normal to the interfaces between said element and terminal blocks, and
  a monitoring means electrically connected to said terminal blocks and being predeterminedly activated by the output signal of the piezoelectric transducer when stressed during a work cycle of the machine.

15. In a machine in accordance with claim 14 wherein said piezoelectric element is a ceramic crystal, and said shielding means is a metallic sheath surrounding said crystal and terminal blocks, and an insulating plastic layer is interposed between said metallic sheath and said crystal and terminals.

16. In a machine in accordance with claim 15 wherein said monitoring means is connected to said terminal blocks by electronic circuitry including a voltage actuated controller means, a relay means connected in series with the voltage actuated means and actuated by current flowing therethrough, a source of D.C. power for said circuit, a D.C. voltage source providing a voltage impressed on said voltage actuated controller means to prevent current through said circuit at the compressed voltage, and electrical leads connecting said voltage actuated means with the terminal blocks of said piezoelectric transducer to transmit to said means said voltage output signal.

17. In a machine in accordance with claim 14 wherein said mounting means comprises a pair of spaced brackets each having one threaded end, said force carrying member having a pair of internally threaded apertures, and said threaded bracket ends each are screwed into one of said force carrying member apertures for secure engagement with said member.

* * * * *